United States Patent
Lambiaso

(10) Patent No.: US 6,811,121 B2
(45) Date of Patent: Nov. 2, 2004

(54) APPARATUS AND METHODS FOR POSITIONING A CABLE BEHIND A FIXED STRUCTURE

(75) Inventor: Guy A. Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 409 days.

(21) Appl. No.: 09/944,340

(22) Filed: Aug. 31, 2001

(65) Prior Publication Data

US 2003/0042039 A1 Mar. 6, 2003

(51) Int. Cl.⁷ .................................................. B64D 1/06
(52) U.S. Cl. ..................................... 244/129.1; 244/119
(58) Field of Search ............................. 244/129.1, 131, 244/125, 118.2, 121, 3.23, 3.1, 3.2

(56) References Cited

U.S. PATENT DOCUMENTS

| | | | | |
|---|---|---|---|---|
| 3,892,095 A | * | 7/1975 | Vankuik et al. ............... 174/48 |
| 4,353,519 A | | 10/1982 | Bogart |
| 4,648,570 A | * | 3/1987 | Abdelmaseh et al. .... 244/118.1 |
| 5,140,659 A | * | 8/1992 | Minds et al. .................. 385/66 |
| 6,427,944 B1 | * | 8/2002 | Passman ................... 244/118.1 |
| 6,513,756 B1 | * | 2/2003 | Lambiaso ................... 244/119 |
| 6,536,710 B1 | * | 3/2003 | Bobzien et al. ............. 244/119 |
| 6,561,454 B1 | * | 5/2003 | White, III .................... 244/1 R |
| 6,619,588 B2 | * | 9/2003 | Lambiaso ................ 244/118.5 |
| 6,644,593 B2 | * | 11/2003 | Lambiaso ................ 244/118.5 |
| 6,664,656 B2 | * | 12/2003 | Bernier ........................ 307/9.1 |
| 6,666,400 B2 | * | 12/2003 | White, III .................... 244/1 R |
| 2003/0106963 A1 | * | 6/2003 | Smallhorn ................... 244/125 |
| 2003/0209630 A1 | * | 11/2003 | White, III .................... 244/1 R |

OTHER PUBLICATIONS

"Electrical Running Cable", Hometime.com pp. 1–2. www.hometime.com/howto/projects/electric/elec_3.htm.*
Running Cable for you Home Newtowrk, Dummies.com, pp. 1–2, www.dummies.com/WileyCDA/DummiesArticle/ID-2268.html.*

* cited by examiner

*Primary Examiner*—Charles T. Jordan
*Assistant Examiner*—Stephen A. Holzen

(57) ABSTRACT

A method for positioning a cable in a recess behind a fixed structure, e.g. a storage bin, in an aircraft. A portion of the cable is enclosed in a conduit. Panels adjacent the structure are removed to partially expose the recess and at least one stringer. The conduit is directed into the recess from adjacent one end of the structure until the conduit passes another end of the structure, and the conduit is fastened to the stringer(s). The method provides an easy way to route cable behind a fixed structure without removing the structure and without having to make holes in the aircraft.

13 Claims, 2 Drawing Sheets

APPARATUS AND METHODS FOR POSITIONING A CABLE BEHIND A FIXED STRUCTURE

FIELD OF THE INVENTION

The present invention relates generally to methods for installing cabling in aircraft and, more particularly, to positioning cabling behind a fixed structure in an aircraft.

BACKGROUND OF THE INVENTION

Seated aircraft passengers typically are provided with lighting and equipment such as seat-based phones and in-flight video services. For passenger convenience and safety, cabling for lighting and equipment typically is hidden under floors and behind sidewalls and other covered recesses in the aircraft cabin. Sidewall panels can be removed to allow cabling to be routed, for example, along stringers secured to the aircraft skin. After the cabling is installed, the panels are repositioned over the cabling. It can be difficult, however, to install cabling behind a cabin sidewall where a fixed structure, for example, a stow bin, is located. Installing cabling in such a location can involve drilling holes through the structure and can be particularly difficult when the cabling is highly flexible.

SUMMARY OF THE INVENTION

In one preferred form, the present invention provides a method for positioning a cable in an aircraft, in a space between the aircraft outer frame and an inner shell such as a cabin wall or ceiling, and behind a structure such as a storage bin mounted to the inner shell. The method can be used where the aircraft frame has a plurality of stringers affixed to an interior surface of the frame and where the inner shell includes a plurality of removable panels. The method includes the steps of enclosing a portion of the cable in a length of flexible conduit, removing panels respectively adjacent at least one of first and second ends of the structure to partially expose the space and at least one stringer accessible within the space, directing the conduit into the space from adjacent one of the first and second ends of the structure until the conduit passes the other one of the first and second ends of the structure, and fastening the conduit to the stringer(s). The above-described method provides an easy way to route cable behind a fixed structure without removing the structure and without having to make holes in the aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Although the present invention is described in connection with a stow bin attached to an aircraft cabin wall, the invention is not so limited. Embodiments of the present invention can be practiced in connection with other structures mounted on a ceiling or other aircraft surface that can be described as an inner shell. It also should be understood that references herein to an aircraft cabin wall include an aircraft cabin ceiling.

Figure 1:
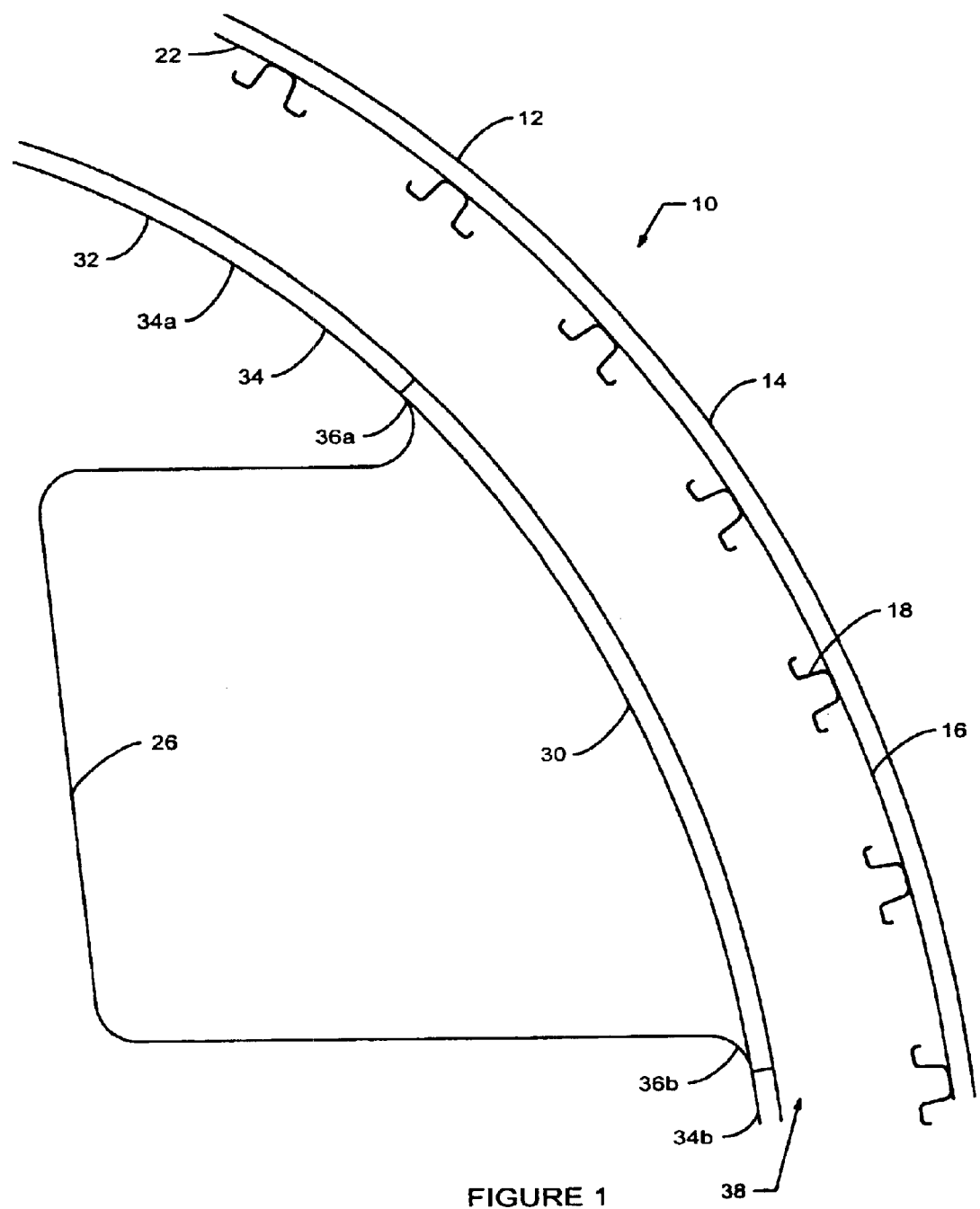
FIG. 1 is a partial cross-sectional view of a portion of an aircraft, shown looking in a fore or aft direction.

FIG. 1 is a partial cross-sectional view of a portion of a fuselage 12 of an aircraft 10, shown looking in a fore or aft direction. An outer frame 14 of the aircraft 10 includes a skin 16 and a plurality of stringers 18 affixed to an interior surface 22 of the skin 16 and extending fore-to-aft. A stow bin 26 is fixedly mounted to an interior cabin wall 30 curving upwardly and horizontally into a cabin ceiling 32. The interior cabin wall 30 and ceiling 32 include a plurality of removable panels 34. Two panels 34a and 34b shown in FIG. 1 are adjacent upper and lower ends 36a and 36b, respectively, of the bin 26. A space or recess 38 behind the bin 26 extends between the wall 30 and the frame 14.

Figure 2:
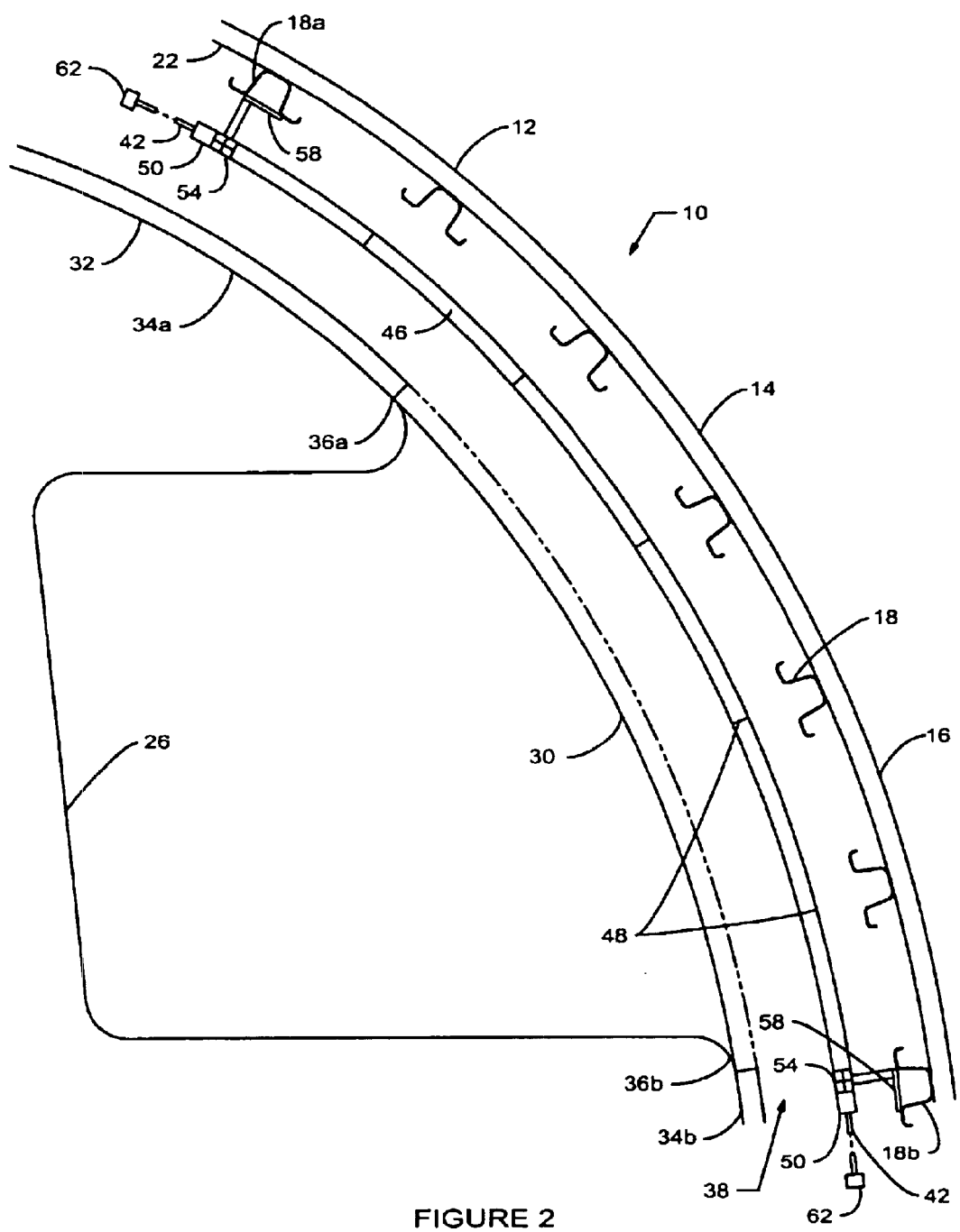
FIG. 2 is a partial cross-sectional view, shown looking in a fore or aft direction, of a portion of an aircraft in which is implemented an exemplary embodiment of the present invention.

FIG. 2 is a partial cross-sectional view of the aircraft 10 after implementation of an exemplary embodiment of the present invention. A cable 42 is positioned in the recess 38 behind the bin 26. A portion of the cable 42 is enclosed in a conduit 46 having a length that spans the bin 26. The conduit 46 is constrained around the cable 42 by a plurality of tie wraps 48. Each end 50 of the conduit 46 is fastened to a stringer 18. In the embodiment shown in FIG. 2, each conduit end 50 is held by a C-clamp 54. Each C-clamp 54 is attached via a suitable stringer attachment device 58 mounted on the associated stringer 18. One such attachment device is a stringer attachment device having part number BACS38J4 by The Boeing Company of Seattle, Wash. It will be appreciated, however, that any suitable alternative method or device for attaching the conduit 46 to the stringers 18 could be used. The cable 42 extends to connectors 62 located under the cabin floor (not shown), above the ceiling 30, or in an alternative location.

A method shall now be described for positioning a cable such as the cable 42 behind the bin 26, as shown in FIG. 2, without having to remove the bin 26 from the wall 30. The conduit 46, although less flexible than cable 42, is sufficiently flexible to be directed into the recess 38, as further described below, and to assume a curvature generally similar to the contour of the fuselage frame 14 so that it fits behind the bin 26. The conduit 46 is fabricated, for example, of polyvinyl chloride (PVC) tubing manufactured by Panduit Corporation, Tinley Park, Ill. The conduit 46 is slit lengthwise and a portion of the cable 42 is enclosed lengthwise in the conduit 46. After the cable 42 is inserted into the conduit, the conduit 46 is tie-wrapped at a plurality of preferably equally spaced-apart locations to constrain the conduit around the cable 42 while allowing movement of the cable 42 through the conduit 46. Where a slit conduit 46 is used as previously described, the cable 42 can be inserted in the conduit 46 without removing one of the connectors 62. Where a connector 62 is small enough to fit with the cable through the conduit 46, the cable 42 and attached connector 62 can be threaded through the conduit ends 50, and the slitting and tie-wrapping steps can be omitted.

Panels 34a and 34b are removed to partially expose the recess 38 and the stringers 18a and 18b. The conduit 46 is directed into the recess 38 from adjacent the bin 26, for example, where the recess 38 is exposed near the upper end 36a, until the conduit 46 passes the end 36b of the bin 26. The conduit 46 then is fastened to the stringers 18a and 18b. The cable 42 can be pulled through the conduit 46 to adjust the cable relative to the conduit and for connection to the connectors 62, and the panels 34a and 34b can be repositioned.

The above-described method and apparatus provide an easy way to route aircraft cabling behind a storage bin or other fixed structure without having to remove the structure. Additionally, the present invention makes it unnecessary to drill holes through the structure or in other locations to route cabling behind such a structure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for positioning a cable in an aircraft, in a space between the aircraft outer frame and an inner shell and behind a structure mounted to the inner shell, the aircraft frame having a plurality of stringers affixed to an interior surface of the frame, the inner shell including a plurality of removable panels, the method comprising the steps of:

enclosing a portion of the cable in a length of flexible conduit;

removing panels respectively adjacent at least one of first and second ends of the structure to partially expose the space and at least one stringer accessible within the space;

directing the conduit into the space from adjacent one of the first and second ends of the structure until the conduit passes the other one of said first and second ends of the structure; and fastening the conduit to the at least one stringer.

2. The method of claim 1 wherein the step of enclosing a portion of the cable comprises the step of slitting the conduit lengthwise.

3. The method of claim 2 further comprising the step of tying the slit conduit in at least one location after enclosing the cable portion in the conduit.

4. The method of claim 3 wherein tying the slit conduit comprises tie wrapping the conduit at a plurality of equally spaced locations.

5. The method of claim 1 wherein the step of fastening the conduit to the at least one stringer comprises inserting the conduit into a C-clamp attached to the stringer.

6. The method of claim 1 wherein the step of enclosing a portion of the cable in the conduit comprises selecting a length for the conduit sufficient to span the structure.

7. The method of claim 1 wherein said steps are performed without removing the structure.

8. The method of claim 1 wherein the step of directing the conduit into the space comprises the step of flexing the conduit.

9. The method of claim 1 further comprising the step of adjusting the cable relative to the conduit and relative to a cable connector.

10. A method for positioning a cable in a recess behind a structure mounted on an aircraft cabin wall, wherein the recess extends between the structure and an interior surface of the aircraft frame upon which are mounted a plurality of stringers, the method comprising the steps of:

without removing the structure, removing at least one of a ceiling panel and a wall panel adjacent the structure to partially expose the recess and at least one of the stringers;

enclosing a portion of the cable in a flexible conduit;

directing the conduit into the recess until the conduit spans the structure; and fastening at least one end of the conduit to the at least one stringer.

11. The method of claim 10 wherein the step of enclosing a portion of the cable comprises slitting the conduit lengthwise.

12. The method of claim 10 wherein the step of fastening at least one end of the conduit comprises inserting the end into a C-clamp attached to one of the stringers.

13. The method of claim 10 further comprising the step of pulling the cable through the conduit to adjust the cable relative to a cable connector.

* * * * *